United States Patent [19]
Hamisch et al.

[11] 3,990,084
[45] Nov. 2, 1976

[54] INFORMATION CARRIER

[75] Inventors: Hansjoachim Hamisch; Hans-Jürgen Kaiser, both of Berlin, Germany

[73] Assignee: Robert Bosch G.m.b.H., Stuttgart, Germany

[22] Filed: Nov. 25, 1974

[21] Appl. No.: 527,161

[30] Foreign Application Priority Data
Nov. 26, 1973 Germany............................ 2358859

[52] U.S. Cl................................. 346/135; 346/76 L; 427/53; 427/250
[51] Int. Cl.²........................................ G01D 15/34
[58] Field of Search..................... 346/135, 76 L, 1; 340/173 LM; 427/250, 53; 219/121 L, 121 LM

[56] References Cited
UNITED STATES PATENTS

| | | | |
|---|---|---|---|
| 2,707,162 | 4/1955 | Fries | 346/135 X |
| 2,938,816 | 5/1960 | Gunther | 427/250 |
| 3,556,837 | 1/1971 | Hammond | 427/250 |
| 3,560,994 | 2/1971 | Wolff et al. | 346/135 |
| 3,636,526 | 1/1972 | Feinleib | 340/173 LM |
| 3,665,483 | 5/1972 | Becker et al. | 346/1 |
| 3,720,784 | 3/1973 | Maydan et al. | 346/76 L X |
| 3,778,785 | 12/1973 | Gutfeld | 340/173 LM X |
| 3,911,444 | 10/1975 | Lou et al. | 346/135 X |

*Primary Examiner*—Joseph W. Hartary
*Attorney, Agent, or Firm*—Michael J. Striker

[57] ABSTRACT

An article for the recording and storage of information includes a support and a layer for storing information provided on the support. The layer is amorphous and composed of a mixture which includes an element of the group bismuth, antimony and selenium and a different element of the group selenium and tellurium. Information may be recorded on the layer by burning away selected regions thereof with high-energy radiation such as a laser beam. A preferred mixture includes bismuth and selenium with the weight ratio of bismuth to selenium being between about 1:2.5 and 1:3.5 for radiation having a wavelength corresponding to visible blue light and with the proportion of selenium being increased for longer wavelengths such as those corresponding to visible green and red light. The layer has a thickness which corresponds to a fraction of the wavelength of the radiation used for recording and the layer is optically opaque. A coating of lacquer may be applied over the layer prior to and/or subsequent to the recording operation so as to protect the layer. The layer is advantageously formed by vapor-depositing the elements selected from the above-mentioned groups onto the support simultaneously.

5 Claims, 1 Drawing Figure

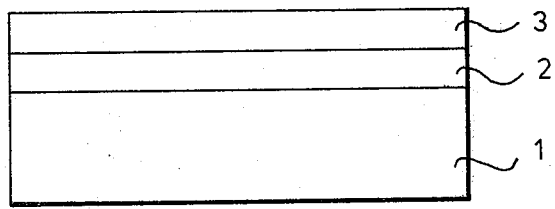

INFORMATION CARRIER

BACKGROUND OF THE INVENTION

The invention relates generally to information carriers. Of particular interest to the invention are information or record carriers on which information may be stored or recorded by means of a beam of high-energy radiation.

Information carriers of the above type may be of plate-like configuration. The recording of information may be effected by relative movement between the radiation beam and the record plate and, in this manner, a mechanically, optically or electrically readable trace representing information or data may be produced on the plate. The radiation beam used may be a modulated beam such as a frequency-modulated beam.

For example, a known record plate comprises a plastic disc. Information is recorded on the disc using a concentrated laser beam and the information trace produced in the disc is in the form of depressions which have been burned into the disc by the laser beam. After the recording operation, the trace is transferred to a mold and the mold is then used to produce a series of information-carrying plates by compression. Subsequently, a metallic substance is vapor-deposited on the thus-produced plates at an oblique angle so that the holes or depressions pressed into the plates during the molding operation remain optically transparent whereas the material adjacent the depressions becomes optically opaque. The information contained in a trace produced in this manner, that is, a trace composed of optically transparent depressions, may be read out again using a fine light beam and a photocell. In this procedure, the traces responsible for the signals are generally not provided on the molds in real time but, rather, are provided on the molds with an extension in the signal sequence.

To amplify upon this somewhat, it is pointed out that the term "real time" as used in this connection is intended to denote that time with which video signals are conventionally taken up and also reproduced, although it should be borne in mind that the invention is not solely concerned with video signals. For instance, the real time for a complete image of a video signal amounts of 1/30 of a second according to the appropriate U.S. Standard.

The recording processes which have become known in recent years such as, for example, those associated with wireless or Philips information carriers, have been directed towards the goal of enabling the information carriers to be reproduced relatively inexpensively. Thus, a master is first made in the manner outlined above. The production of the master is not, however, carried out by the user but, rather, is effected in a central factory. During the production of the master, this is moved quite slowly and, accordingly, the signals are recorded with an extension in time. In other words, the signals are not recorded in real time but are recorded such that they are drawn out or extended in time. As a result, the traces responsible for the signals are not provided on the mold in real time but are extended in time.

Although a procedure such as briefly outlined above does permit information to be recorded and retrieved, it is often desirable for the trace responsible for the signals to be provided on the information carrier in real time and for the signals to be obtained in real time.

Thus, for the production of information traces in real time by burning away or vaporizing certain regions of an information carrier, the U.S. Pat. No. 3,181,170 has already proposed materials such as cadmium, anthracene or a suitable plastic substance for use in forming a vaporizable layer. However, the reflectivity of metals such as cadmium, and also aluminum, for instance, as well as the vaporizing temperatures of such metals, are quite high. On the other hand, the absorbing power of anthracene and plastic materials for radiation is quite low. Hence, in either case, the laser energy required for the production of information traces, which energy determines the price of the laser, is too high.

These problems have been overcome to some extent by the recording medium described in Federal Republic of Germany patent application No. 1,574,687, which corresponds to our U.S. Pat. No. 3,560,994. Here, it has been proposed to use a two-layer configuration for the purpose of obtaining a radiation-susceptible arrangement which enables signal-producing traces to be achieved by means of a modulated radiation beam. One of the layers may consist of bismuth and the other layer may consist of selenium and the arrangement may be produced by first forming one layer from one of the elements and then forming the other layer from the other of the elements. This arrangement is, as such, suitable for the production of the signal patterns of video signals in real time.

It has, however, been found that the characteristics of this arrangement are not entirely satisfactory and that, with the even more stringent requirements being imposed on the density of the recorded information, further improvements in the characteristics of the recording layer or layers are desirable.

Thus, since the information produced by frequency-modulated recording is represented by the precise positions and lengths of the "burned in" holes or depressions, that is, the depressions formed by burning away certain regions of a layer, particularly stringent requirements are imposed on the reproducibility of these dimensions, i.e., the positions and lengths of the depressions. The variations may, at most, be of the order of 100 angstroms. This requires a very homogeneous material for the recording layer.

The desired homogeneity may be obtained with amorphous layers. However it is not sufficient merely to use an amorphous material for the layer. Thus, in addition to being amorphous, the material should possess characteristics which enable as low a recording energy as possible to be achieved.

Non-grainy organic layers are known. Such layers are suitable for recording purposes when a change in transparency can be achieved by irradiation and the recording of information can be accomplished in this manner. An example of a layer which is capable of recording information by a change in transparency is one produced by the Ozalid process. For layers of this type, the thickness of the layer is not particularly critical and even layer thicknesses as great as the order of 1 micron or so may be satisfactorily used.

However, if the recording procedure involves the removal of material from the recording layer by means of radiation, i.e., vaporization of the material of the recording layer, then an additional condition is imposed on the layer and, in particular, a condition is imposed on the thickness of the layer. Thus, in such a case, the thickness of the recording layer should amount to only a small fraction of the wavelength of the radiation used for the recording of the information on the layer. This requirement may be fulfilled with metallic layers which are already sufficiently opaque at thicknesses of a few hundred angstroms.

To date, however, no suitable amorphous recording layers of such thicknesses have been achieved.

SUMMARY OF THE INVENTION

It is, accordingly, a general object of the invention to provide a novel information carrier and a method of producing the same.

Another object of the invention is to provide an information carrier and a method of making the same which enable signal-producing information traces to be recorded in real time and to be retrieved in real time.

A further object of the invention is to provide an information carrier and a method of making the same which enable information to be recorded with only small energy expenditure.

An additional object of the invention is to improve on the current state of the art and to provide an improved information carrier for the storage of information by means of radiation.

It is also an object of the invention to provide a novel layer for the production of signal-producing traces on an information carrier or the like, as well as a method of producing the same, and which enable the traces to be recorded in real time and to be read back in real time.

A concomitant object of the invention is to provide an amorphous, metal-containing material and a method of making the same.

Another object of the invention is to provide an amorphous, metal-containing recording layer, as well as a method of making the same, and which layer is sufficiently opaque, even at small thicknesses thereof, to enable information traces to be produced thereon by means of radiation.

An additional object of the invention is to provide an amorphous, metal-containing recording layer and a method of making the same which enable information to be recorded with only small energy expenditure.

These objects, and others which will become apparent hereinafter, are achieved in accordance with the invention. According to one aspect of the invention there is provided an article for the recording of information or data, particularly for the storage of information or data by the burning away or vaporization of selected regions with radiation, which comprises a support and an amorphous layer for storing information provided on the support. The amorphous layer comprises a mixture which includes a first element selected from the group consisting of bismuth, antimony and selenium and a different second element selected from the group consisting of selenium and tellurium.

Another aspect of the invention resides in a method of making an information-carrying article. In such a method, the invention provides for the step of depositing a first element selected from the group consisting of bismuth, antimony and selenium and a different second element selected from the group consisting of selenium and tellurium on a support so as to form on the support an amorphous layer for the storage of information and which layer comprises a mixture which includes the aforesaid first and second elements.

The amorphous layer in accordance with the invention is one which is suitable for use in the production of signal-producing traces on an information carrier or the like and which enables the traces to be recorded in real time and to be read back in real time.

As indicated above, of particular interest to the invention is an article or information carrier for the storage or recording of information by means of radiation, especially a high-energy radiation beam, and, hence, the description herein will be primarily with reference thereto, that is, with reference to an article or information carrier for the recording or storage of information by burning away or vaporizing selected regions of the article or information carrier.

The amorphous layer of the invention may be formed by depositing the first element from the group of bismuth, antimony and selenium and the different second element from the group of selenium and tellurium simultaneously. Preferably, deposition of the first and second elements is effected by simultaneously vapor-depositing these elements. It may be seen that this variation of the method of the invention departs from the prior method of the above-referenced German application in that, according to the invention, amorphous layers, including amorphous, metal-containing layer, are obtained by vapor-depositing the elements such as, for instance, bismuth and selenium, simultaneously instead of vapor-depositing the elements one after the other and separately as in the prior method.

According to a preferred embodiment of the invention, the amorphous layer contains a mixture of bismuth and selenium. However, a mixture of bismuth and tellurium also possesses favorable properties or characteristics as does a mixture of antimony and selenium and a mixture of selenium and tellurium. The optimum proportion of the elements in the mixture depends upon the wavelength of the radiation used for the recording operation. For layers containing bismuth and selenium, the most favorable proportion by weight of bismuth to selenium lies in the range of about 1:2.5 to about 1:3.5, this being particularly true when blue argon light is used for recording. When radiation of longer wavelength is used, the ratio or proportion of bismuth to selenium may shift in the direction of higher selenium contents. For layers containing bismuth and tellurium, the most favorable proportion by weight of bismuth to tellurium is between about 1:2 and about 1:4. For layers containing selenium and tellurium, the most favorable proportion of selenium to tellurium lies in the range of about 1:1 to about 4:1 whereas, for layers containing antimony and selenium, the most favorable proportion of antimony to selenium is between about 1:1.2 and about 1:3.

It is advantageous for the amorphous layer to be coated with a thin, protective layer of lacquer before and/or after the recording of a signal-producing trace on the amorphous layer in order to prevent scratching of and dust accumulation upon the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The signal FIGURE is a side view of a schematic representation of an article according to the invention which may be used for the recording of information.

DESCRIPTION OF THE PREFERRED EMBODIMENTS

The FIGURE schematically illustrates an article for the recording of information or data. The article may, for instance be of sheet-like, plate-like or band-like configuration.

It may be seen that the article includes a layer 1 which serves as a support or carrier. The layer 1 may be made of any material conventionally used for this purpose, for instance, a synthetic resin, e.g., an acrylic resin such as Plexiglas.

A layer 2 is provided on the support 1 and the layer 2 serves for the recording or storage of information or data. The layer 2 has an amorphous nature and, in accordance with the invention, comprises a mixture which includes an element selected from the group consisting of bismuth, antimony and selenium and a different element selected from the group consisting of selenium and tellurium. A preferred mixture for the layer 2 includes bismuth and selenium and the weight ratio of bismuth to selenium in the mixture may lie between about 1:2.5 and 1:3.5 although, as will be discussed again hereinafter, it is of advantage under appropriate circumstances for the proportion of selenium to be increased. Although a preferred mixture for the layer 2 includes bismuth and selenium, mixtures which include bismuth and tellurium, mixtures which include selenium and tellurium and mixtures which include antimony and selenium also provide desirable recording characteristics for the layer 2. For mixtures which include bismuth and tellurium, the proportion of bismuth to tellurium is advantageously in the range of about 1:2 to about 1:4. For mixtures which include selenium and tellurium, the proportion of selenium to tellurium is favorably between about 1:1 and 4:1 while, for mixtures which include antimony and selenium, the proportion of antimony to selenium advantageously lies in the range of about 1:1.2 to 1:3. The layer 2 is advantageously optically opaque and this may already be achieved when the thickness of the layer 2 is of the order of only a few hundred angstroms.

In the illustrated embodiment, a layer 3 is provided on or coats the layer 2 and the purpose of the layer 3 is to protect the recording layer 2 against damage and dirt. The layer 3 is advantageously in the form of a lacquer coating such as is conventionally used in the art. The type of lacquer to be used for the layer 3 is partially determined by the material of the support 1. Thus, care should be exercised in the selection of the lacquer to be used for the layer 3 to insure that the solvent of the lacquer does not dissolve or otherwise attack the support 1. For instance, if the support 1 is made of Plexiglas, the solvent in the lacquer used for the layer 3 should be ethyl acetate for this reason. Aside from this consideration in selecting the lacquer to be used for the layer 3, the lacquer should have been good transparency and be of a good degree of purity.

The lacquer coating constituting the layer 3 may be applied to the layer 2 prior to the recording of information thereon or subsequent to the recording of information thereon. It is also possible to apply lacquer over the layer 2 before the recording of information thereon and to then apply additional lacquer over the layer 2 subsequent to the recording of information thereon.

It will be understood that no attempt has been made to duplicate either the actual dimensions which the various layers have in practice or the actual relative thicknesses of the different layers.

The procedure involved in making an information-carrying article such as illustrated in the FIGURE includes the operation of depositing a first element selected from the group consisting of bismuth, antimony and selenium and a differet second element selected from the group consisting of selenium and tellurium on the support 1 so as to form the amorphous layer 2. The latter may consist essentially of a mixture of bismuth and selenium, or a mixture of bismuth and tellurium, or a mixture of antimony and selenium, or a mixture of selenium and tellurium. In accordance with the invention, the first and second elements of the layer 2 are advantageously deposited on the support 1 substantially simultaneously. A preferred embodiment of the invention provides for vapor-depositing the first and second elements onto the support 1 substantially simultaneously.

The manner of vapor-depositing elements onto a substrate need not be discussed in detail here since vapor-deposition per se is known in the art. However, it is briefly noted that the vapor-deposition of the individual components may be carried out conventionally but advantageously using a non-cooled substrate, i.e., non-cooled support 1. Whether or not the mixed layer 2 thus formed is amorphous resides mainly in the selection of the components to be vapor-deposited. It should also be mentioned that, as opposed to the requirements imposed in conventional vapor-deposition processes wherein only one component at a time is vapor-deposited, there exists an additional condition which should be observed where two different components are vapor-deposited simultaneously. This additional condition resides in that the relationship between the quantities of the different components being vapor-deposited should be maintained substantially constant during the vapor-deposition.

In connection with the vapor-deposition of the first and second elements to form the layer 2, it is worthwhile pointing out that the amorphous layer 2 must be capable of remaining stable for extended periods of time at room temperature. Hence, substances which can form amorphous, vapor-deposited layers only upon being deposited on a substrate which has a temperature corresponding to that or lower than that of liquid air are not suitable for use in forming the amorphous layer 2 according to the invention.

Subsequent to the deposition of the first and second elements onto the support 1 to form the layer 2, the latter may, if desired, be coated with lacquer thereby forming the layer 3. However, the coating of the layer 2 with the protective layer 3 is not an absolute requirement and may be omitted.

In either event, the layer 2 formed by the deposition of the first and second elements onto the support 1 may be provided with information. A preferred embodiment of the invention provides for accomplishing this by directing a beam of radiation at selected regions of the layer 2 so as to at least partially burn away the layer 2 in these regions, that is, so as to cause vaporization of at least some of the material of the layer 2 in these regions. Advantageously, this is achieved using a laser beam. For this embodiment of the invention, that is, the embodiment wherein information is produced on the layer 2 by burning away or vaporizing selected regions thereof, the layer 2 should be at least substantially optically opaque and the deposition of the first and second elements onto the support 1 should be continued until the thickness of the layer 2 is sufficiently great to achieve this.

The radiation beam, e.g. laser beam, used for recording information on the layer 2 may have a wavelength which lies substantially in the wavelength range of the visible spectrum. For the purpose of orientation, it may be mentioned that the visible spectrum encompasses the wavelength range corresponding to visible blue, visible green and visible red light, that is, the wavelength range extending from a wavelength of about 400 millimicrons to about 700 millimicrons. The shortest wavelengths of the visible spectrum correspond to blue light whereas the longest wavelengths correspond to red light and the intermediate wave lengths correspond to green light.

The thickness of the layer 2 should be less than the wavelength of the radiation used for recording information thereon and, advantageously, the thickness of the layer 2 amounts to only a small fraction of the wavelength of the radiation used for recording purposes, that is, it is of advantage for the layer 2 to be thin as compared to the wavelength of the radiation used for recording purposes. Thus, the deposition of the first and second elements onto the support 1 should be discontinued before the thickness of the layer 2 becomes too great, i.e., should be discontinued when the thickness of the layer 2 is still less than the wavelength of the radiation which it is contemplated to use for recording information on the layer 2.

As has been indicated earlier, the optimum composition of the layer 2, that is, the optimum proportion of the first and second elements in the layer 2, depends upon the wavelength of the radiation which is to be used for recording purposes. Hence the operation of depositing the first and second elements onto the support 1 so as to form the layer 2 should be carried out with a view to the wavelength of the radiation which it is contemplated to use for recording information on the layer 2. For example, a preferred mixture for the layer 2 includes bismuth and selenium. If radiation having a wavelength corresponding to visible blue light is to be used for the recording of information, then the deposition of bismuth and selenium onto the support 1 is advantageously carried out in such a manner that the weight ratio of bismuth to selenium in the layer 2 is between about 1:2.5 and 1:3.5 since it has been found that optimum recording characteristics may be obtained with such ratios. On the other hand, if radiation having a wavelength longer than that corresponding to visible blue light, e.g., radiation having a wavelength corresponding to visible green light or to visible red light, is to be used for the recording of information, then the proportion of selenium is advantageously increased. The optimum proportion of the elements in a particular mixture for a particular wavelength may be determined experimentally.

The relationship between the composition of the layer 2 and the wavelength of the radiation used for recording stems from the desired goal of achieving maximum utilization of the recording capacity of the radiation with a minimum thickness of the layer 2. This means that the layer 2 desirably has the lowest possible reflectivity and, concomitantly, has as great an absorption capability for the radiation as possible. Both of these conditions are dependent upon the wavelength of the radiation. By suitable selection of the proportions of the mixture used for the layer 2, a certain amount of adjustment to obtain optimum utilization of the recording capacity of the radiation is possible. Thus, it has been mentioned above that the proportion of selenium in mixtures which include bismuth and selenium is advantageously increased when the wavelength of the radiation used for recording is increased from that corresponding substantially to visible blue light. The same is true for the proportion of selenium in mixtures which include antimony and selenium. Similarly, the proportion of tellurium in mixtures which include bismuth and tellurium is advantageously increased when the wavelength of the radiation used for recording increases from that corresponding substantially to visible blue light. The upper limits of selenium and tellurium in the mixtures are not sharply defined.

In addition to the characteristics just outlined, which it is desirable for the layer 2 to posses, there exists, of course, the requirement that the layer 2 be amorphous. In this connection, it may be mentioned that the layer 2 may, instead, have a very fine, crystalline structure, that is, a crystalline structure wherein the average crystal size is equal to or less than 20 angstroms. Such a crystalline structure is to be understood herein to be encompassed by the term "amorphous."

Subsequent to the recording of information on the layer 2, lacquer may be applied over the latter. This lacquer coating may be the first protective coating applied over the layer 2, thereby forming the layer 3, or, on the other hand, may be in addition to a lacquer coating previously applied to the layer 2 before the recording operation.

The information stored on the layer 2 may thereafter be retrieved therefrom when desired using appropriate equipment for reading the traces provided on the layer 2.

It is pointed out that it is theroretically possible to use mixtures for the layer 2 which include more than two of the elements bismuth, antimony, selenium and tellurium. Since, however, the desired effect, that is, a layer having an amorphous structure (meaning also that the layer could have a very fine crystalline structure), may already be achieved using only two of these elements, it is not necessary for the layer 2 to include more than two of these elements. Furthermore, a preferred embodiment of the invention contemplates vapor-depositing different elements for the layer 2 substantially simultaneously. In this connection, it has been indicated earlier that the relationship between the quantities of the different components being vapor-deposited is favorably maintained substantially constant during the deposition. Thus, since a controlled vapor-deposition of three or more components requires a substantially greater expenditure than one involving only two components, it is currently preferred for an amorphous, vapor-deposited layer according to the invention not to include more than two of the elements bismuth, antimony, selenium and tellurium.

It will be understood that each of the elements described above, or two or more together, may also find a useful application in other types of processes and articles differing from the types described above.

While the invention has been illustrated and described as embodied in an information carrier and a method of making the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. For use in a system for recording information by exposure of a substance that can be burned away or vaporized with high-energy radiation, particularly a laser beam, a recording medium comprising a sheet-like support and an opaque layer applied to one side of the said support, the said opaque layer being an amorphous mixture of bismuth and selenium in a weight ratio between the ratios of 2 : 5 and 2 : 7, respectively.

2. A recording medium as defined in claim 1 in which the thickness of the opaque layer is less than the wavelength of the high-energy radiation to which it is to be exposed.

3. A recording medium as defined in claim 1 in which the opaque layer consisting of a mixture of bismuth and selenium has been formed by simultaneously depositing vapors of bismuth and selenium upon the said support.

4. A recording medium as defined in claim 1 comprising an additional protective layer deposited thereon from a lacquer.

5. A recording medium as defined in claim 4 in which the sheet-like support is an acrylic resin and the solvent component of the lacquer is ethyl acetate.

* * * * *